UNITED STATES PATENT OFFICE.

THERESIA J. WALTERSKIRCHEN, OF MISSOULA, MONTANA.

PROCESS FOR TREATING BRAN.

1,379,494. Specification of Letters Patent. Patented May 24, 1921.

No Drawing. Application filed May 11, 1920. Serial No. 380,476.

*To all whom it may concern:*

Be it known that I, THERESIA J. WALTERSKIRCHEN, a citizen of the United States, residing at Missoula, in the county of Missoula and State of Montana, have invented certain new and useful Improvements in Processes for Treating Bran, of which the following is a specification.

This invention relates to cereals, and more particularly to bran used as a health food and a process of treating the same.

The object of the invention is to treat ordinary wheat bran so as to render it palatable when eaten alone or in combination with other cereals.

The objects of the invention are accomplished in the manner described in the following specification.

In carrying out the invention, the ordinary wheat or other grain bran is toasted by roasting or baking it in an oven or in open pans on top of the stove until thoroughly browned or toasted preferably to a light amber color. The so treated bran may then be eaten alone or with cream or combined with other cereals or fruits and is quite palatable, whereas when eaten raw it is extremely distasteful and difficult to take either as a food or a medicine.

What is claimed is:

A cereal composed of untreated toasted bran.

In testimony whereof, I affix my signature hereto.

THERESIA J. WALTERSKIRCHEN.